United States Patent
Wang et al.

(10) Patent No.: US 7,896,078 B2
(45) Date of Patent: Mar. 1, 2011

(54) METHOD OF USING CROSSLINKABLE BRINE CONTAINING COMPOSITIONS

(75) Inventors: Xiaolan Wang, Spring, TX (US); Qi Qu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/353,875

(22) Filed: Jan. 14, 2009

(65) Prior Publication Data

US 2010/0175880 A1    Jul. 15, 2010

(51) Int. Cl.
*E21B 36/00* (2006.01)
*E21B 43/24* (2006.01)
*E21B 33/12* (2006.01)

(52) U.S. Cl. .................... 166/302; 166/300; 166/387

(58) Field of Classification Search .................. None
See application file for complete search history.

(56) References Cited

U.S. PATENT DOCUMENTS

| | | | |
|---|---|---|---|
| 4,799,962 A | 1/1989 | Ahmed | |
| 6,489,270 B1 | 12/2002 | Vollmer et al. | |
| 6,632,779 B1 | 10/2003 | Vollmer et al. | |
| 6,746,992 B2 | 6/2004 | Kippie et al. | |
| 6,908,886 B2 | 6/2005 | Jones et al. | |
| 6,983,801 B2 | 1/2006 | Dawson et al. | |
| 7,306,039 B2 | 12/2007 | Wang et al. | |
| 7,316,275 B2 | 1/2008 | Wang et al. | |
| 7,322,411 B2 | 1/2008 | Brannon et al. | |
| 2004/0059054 A1 | 3/2004 | Lopez et al. | |
| 2005/0113264 A1 | 5/2005 | Vollmer | |
| 2005/0272612 A1 | 12/2005 | Dawson et al. | |
| 2006/0131536 A1 | 6/2006 | Qu et al. | |
| 2007/0167542 A1* | 7/2007 | Lopez et al. | 524/57 |
| 2007/0209795 A1 | 9/2007 | Gupta | |
| 2007/0259791 A1 | 11/2007 | Wang et al. | |
| 2008/0113883 A1 | 5/2008 | Wang et al. | |
| 2008/0176411 A1 | 7/2008 | Horton et al. | |
| 2008/0274013 A1 | 11/2008 | Stevens et al. | |
| 2009/0203554 A1 | 8/2009 | Monroe et al. | |

* cited by examiner

*Primary Examiner* — Zakiya W. Bates
(74) *Attorney, Agent, or Firm* — John Wilson Jones; Jones & Smith, LLP

(57) ABSTRACT

A method of enhancing the productivity of a subterranean formation penetrated by a gas, oil or geothermal well consists of introducing into the formation and/or well a pumpable polymerizable fluid comprising a crosslinkable, monofunctional alkene, multi-functional alkene (such as a difunctional alkene), a heat inducible free radical initiator and brine. The fluid may be used in the thermal insulation of production tubing or transfer pipes and hydraulic fracturing.

28 Claims, 1 Drawing Sheet

METHOD OF USING CROSSLINKABLE BRINE CONTAINING COMPOSITIONS

FIELD OF THE INVENTION

The productivity of a subterranean formation may be enhanced by the use of a pumpable polymerizable fluid containing a crosslinkable, monofunctional alkene, a multi-functional alkene, free radical initiator and a brine.

BACKGROUND OF THE INVENTION

Aqueous based well treatment fluids are commonly used in drilling, stimulation, completion and workover operations of subterranean formations. Treatment designs typically mandate such fluids to exhibit a certain level of viscosity. Viscosifying polymers are often used in such fluids to provide the requisite viscosity. For instance, the viscosifying polymers are used to thicken fluids to prevent their loss into the formation. In hydraulic fracturing, the viscosifying polymer provides the requisite viscosity for proppant to be suspended in the fracturing fluid and to be carried into the formation. In addition, the viscosifying polymer prevents the proppant from prematurely settling from the viscosified fluid.

Viscosifying polymers, when present in thermal insulating fluids, are used to prevent or minimize heat loss from production tubing. Such fluids are characterized by low thermal conductivity and convection velocity and are capable of thermally insulating the wellbore. In addition, such fluids, when added either into an annulus or riser, effectively reduce undesired heat loss from the production tubing. For instance, thermal insulating fluids reduce the heat loss from a hot annulus to a cold annulus by reducing the fluid thermal convection caused by the temperature differential between the high temperature environment of the inner annulus and the low temperature environment of the outer annuli. Such fluids are further capable of reducing the amount of heat transfer from the production tubing to the surrounding wellbore, outer annuli and riser. Heat loss from produced fluids due to conduction and convection can also be reduced by more than 90% when compared with conventional packer fluids.

Examples of viscosifying polymers used in well treatment fluids include synthetic polymers and polysaccharides such as acrylamide based polymers and copolymers, and guar and guar derivatives like hydroxypropyl guar, carboxymethylhydroxypropyl guar and carboxymethyl guar. Fracturing and thermal insulating fluids typically contain between from about 0.1 to 10 weight percent of such synthetic polymers or polysaccharides. Often, the fluid is brine-based. An exemplary thermal insulating fluid contains about 1 weight percent of carboxymethylhydroxypropyl guar, 25 volume percent of propylene glycol, 75 volume percent of brine, and optionally, a biocide, and a corrosion inhibitor.

Ancillary to the need for maintaining viscosity, the well treatment fluid is often desirable to have a sufficiently high density for the well treatment fluid to provide increased hydrostatic pressure and to be able to offset the relatively high pressure downhole, or to reduce required pump horsepower. It is desirous therefore to use brines with higher density than water to meet such demands. Exemplary of brines are sodium chloride, potassium chloride, calcium chloride, sodium bromide, calcium bromide, zinc bromide, potassium formate, cesium formate and sodium formate brines.

High density brines have particular applicability in deep wells, such as those that descend 15,000 to 30,000 feet (4,500 to 10,000 meters) or more below the earth's surface. In addition, high-density brines have been found to be capable of maintaining the requisite lubricity and viscosity of the well treatment fluid under extreme shear, pressure and temperature variances encountered during operations of deep wells.

For instance, fracturing fluids based on high-density brines are useful in deepwater and ultra-deepwater wellbore areas. Such areas require excessively high fracturing pressures. Fracturing fluids based on high-density brines exhibit exemplary hydrostatic head pressure to assist pump pressure.

The use of high-density brines in applications conducted at high temperatures and pressure is, however, difficult. Viscosifying polymers are hard to hydrate in high-density brines due to the high salt concentration and limited free water made available by the brine. While hydration of polymer in sodium salt based brines, such as sodium bromide brine and sodium chloride, may be achieved through manipulation of the pH of the brine, high concentration divalent ions such as $Ca^{++}$ and $Zn^{++}$ in higher density brines make hydration of viscosifying polymers (polysaccharides as well as synthetic polymers) extremely difficult. In case a polymer is hydratable in such brines, maintaining the gel stability at elevated temperature becomes rather challenging. The inability to satisfactorily hydrate the polymer in the presence of $Ca^{++}$ and $Zn^{++}$ has become a major obstacle in developing high-density brine based fracturing fluids.

Methodologies have therefore been sought for the use of well treatment fluids containing high-density brines, especially in deepwater wells.

SUMMARY OF THE INVENTION

An effective thermal insulating fluid and fracturing fluid, especially for use in deep wells, contains at least one hydratable polymerizable monomer, a multi-functional alkene (such as a difunctional alkene), a free radical initiator and a brine. The fluid may optionally contain a polyol. The hydratable polymerizable monomer(s) render a crosslinked polymeric system with the multi-functional alkene(s).

The brine is preferably one which has a density greater than or equal to 9 ppg. For instance, the brine may have a density between 9 to 19.2 and may include such brines as calcium chloride, calcium bromide, zinc bromide, sodium chloride, potassium chloride, sodium bromide, potassium formate, cesium formate and sodium formate brine and mixtures thereof. In a preferred embodiment, the brine contains calcium chloride, calcium bromide and/or zinc bromide.

Suitable hydratable polymerizable organic monomers include acrylic as well as methacrylic based monomers, such as acrylic acid and methacrylic acid as well as derivatives thereof including amide, ester, salt and nitrile derivatives. Suitable multi-functional alkenes include such difunctional alkenes as diethylene glycol dimethacrylate, diethylene glycol diacrylate, polyethylene glycol dimethacrylate and polyethylene glycol diacrylate.

The free radical initiator is heat sensitive. As such, onset of polymerization downhole may be delayed.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
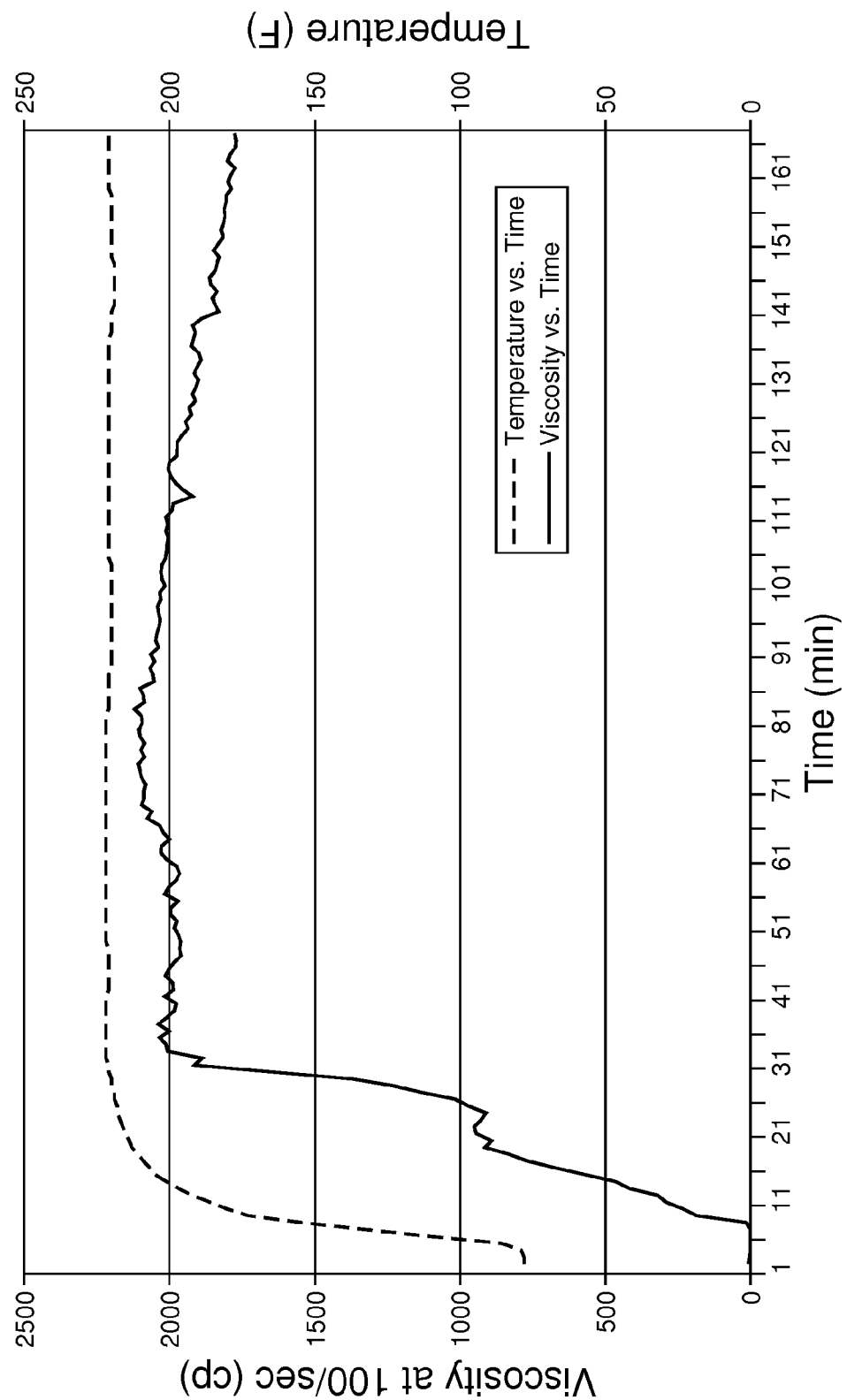
FIG. 1 is a rheology profile of a fluid defined herein containing a brine of 14.2 ppg.

The fluid defined herein is used to enhance the productivity of a subterranean formation penetrated by an oil, gas or geothermal well. The fluid is particularly effective in the thermal insulation of production tubing or transfer pipes and as a fracturing fluid for use in hydraulic fracturing.

The pumpable, polymerizable well treatment fluid defined herein contains at least one hydratable polymerizable monomer such as a monofunctional alkene containing one ethylenically unsaturated group. The amount of hydratable polymerizable monomer in the fluid is typically between from about 1% to about 30% by weight of the fluid.

In addition to the hydratable polymerizable monomer, the well treatment fluid defined herein contains at least one multi-functional alkene containing two or more ethylenically unsaturated groups. Preferred multi-functional alkenes are difunctional alkenes containing two ethylenically unsaturated groups. Such alkenes function to form a crosslinked polymeric system.

Preferred hydratable polymerizable monomers include at least one monofunctional alkene in combination with at least one multi-functional alkene. The multi-functional alkene serves as crosslinker. A difunctional alkene may be used in combination with a multi-functional alkene containing three or more ethylenically unsaturated groups. Typically, the volume ratio of the crosslinkable, monofunctional alkene(s) to multi-functional alkene(s) in the pumpable polymerizable fluid is between from about 2:1 to about 20:1. The hydratable polymerizable monomer(s) render a crosslinked polymeric system with the multi-functional alkene(s).

In addition to the hydratable polymerizable monomer(s) and the crosslinking monomer(s), the fluid contains a free radical initiator.

The brine typically used in the fluid is one which has a density greater than or equal to 9 ppg. For instance, the brine may have a density between 9 to 19.2 and may include such brines as calcium chloride, calcium bromide, zinc bromide, sodium chloride, potassium chloride, sodium bromide, potassium formate, cesium formate and sodium formate brine and mixtures thereof. In a preferred embodiment, the brine contains calcium chloride, calcium bromide and/or zinc bromide.

Suitable hydratable polymerizable organic monomers include free radical polymerizable monomers including self-crosslinking monomers like acrylic or methacrylic based monomers such as acrylic acid, methacrylic acid or an amide, ester, salt or nitrile thereof. These include (meth)acrylic-based monomers such as hydroxyethylacrylate, hydroxymethylacrylate, hydroxyethylmethacrylate, hydroxymethylmethacrylate, polyethylene glycol acrylate, polyethylene glycol methacrylate, polypropylene glycol acrylate, polypropylene glycol methacrylate, tetrahydrofuryl methacrylate, glycidyl methacrylate, N,N-dimethylaminoethylmethacrylate, 2-triethylammoniumethylmethacrylate chloride, N,N-dimethyl-aminopropylmethacryl-amide, methacrylamidepropyltriethylammonium chloride, N-hydroxymethylacrylamide and N-hydroxymethyl-methacrylamide and mixtures thereof.

Suitable difunctional alkenes include diethylene glycol dimethacrylate, diethylene glycol diacrylate, polyethylene glycol dimethacrylate and polyethylene glycol diacrylate.

Instead of hydrating the polymer in the brine, the fluids defined herein are prepared by dissolving the monofunctional alkene(s) and multi-functional alkene(s), crosslinker and the initiator, typically a heat inducible initiator, in the brine. Once the solution is heated to the decomposition temperature of the initiator while stirring, the polymerization process takes place, and a gelled and crosslinked system is obtained. The heat inducible free radical initiator is heat sensitive such that the onset of polymerization may be delayed until the fluid reaches a targeted destination downhole. Any heat activated initiator that forms free radicals in aqueous solution at the downhole temperature where placement of the fluid is desired may be used. Such initiators may include alkali metal persulfates, peroxides as well as azo polymerization initiators such as 2,2'-azobis(2-imidazole-2-hydroxyethyl)propane, 2,2'-azobis(2-aminopropane)dihydrochloride, 4,4'-azobis(4-cyanovaleric acid) and 2,2'-azobis(2-methyl-N-(2-hydroxyethyl)propionamide.

The initiator is present in the well treatment fluid in an amount sufficient to initiate polymerization of the water-soluble polymerizable organic monomer(s) and crosslinking of the multi-functional alkene to form a polymeric network (crosslinked) system. The solvent of the system is immobilized by the high viscosity attributable to the crosslinking.

The initiator may be present in an amount between from about 0.01 to about 5 g/100 ml of the well treatment fluid. By selecting the appropriate initiator, gel formation may be initiated at different temperatures (ambient at surface or elevated at downhole). The temperature-induced delay mechanism offered by the well treatment fluid enables an operator to pump a thin solution into the borehole which may thicken later at elevated temperatures. By changing the ratio among monofunctional alkene, multi-functional alkene and initiator, the resulting crosslinked heavy brine may have a rubber-like or flowable texture.

The methodology described herein for using the well treatment fluid downhole is highly advantageous since synthetic polymer based fluids typically have better thermal stability compared to polysaccharide based fluids although synthetic polymers are often very difficult to hydrate in high density brines especially in calcium and zinc based brines. The well treatment fluid defined herein may further include a polyol as a solvent. Such solvents are especially preferred when the well treatment fluid is used as a thermal insulating fluid sine the polyol may reduce the thermal conductivity of the fluid and thus improve thermal insulation properties of the fluid. Suitable polyols include glycerol, a glycol or a polyglycol and mixtures thereof. Such polyols may be well suited for deep wellbores that exert high temperature and pressures on fluids.

Suitable glycols include ethylene glycol, propylene glycol and butylene glycol. The polyglycols can be selected from a wide range of known polymeric polyols that include polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers and mixtures of these polymers. A wide variety of polyglycols is commercially available. Most commercially available polyglycols include polyethylene glycol, and are usually designated by a number that roughly corresponds to the average molecular weight. Examples of useful commercially available polyethylene glycols include polyethylene glycol 4000 and polyethylene glycol 6000. Preferably the polymeric polyols for use in the present invention are selected to have a number average molecular weight, $M_n$, of about 150 to about 18,000 Daltons. More preferably, the polymeric polyols are selected to have number average molecular weight of about 190 to about 10,000 D. Yet most preferably, the polymeric polyols are selected to have number average molecular weight of about 500 to about 8,000 D. When present, the composition of the invention will typically contain between from about 10 to about 80 wt % of polyol.

When used as a thermal insulating fluid, the well treatment fluid defined herein may be prepared on the surface and then pumped through tubing in the wellbore or in the annulus. In a preferred embodiment, the fluid is a packer or riser fluid and the packer fluid is introduced above the packer in an annulus and the riser fluid is introduced into a riser annulus.

While high viscosity, thickened fluid is highly desirable after the fluid is positioned in the annulus, large amounts of energy are required to pump such fluids through tubing and annular spaces. The delayed crosslinking is desired since it reduces the amount of energy required to pump viscous fluids through the tubing by permitting pumping of a relatively less viscous fluid having relatively low friction pressures within the well tubing. Crosslinking is typically affected when the fluid is placed in the annulus after which the advantageous properties of thickened crosslinked fluid are then available for thermal insulation.

When used as a thermal insulating fluid, the fluid defined herein serves a dual purpose. First, the fluid serves to prevent heat transfer/buildup in the outer annuli. Second, the fluid serves to retain heat within the produced hydrocarbons.

Since convection is fluid motion caused by the variation of fluid density with temperature, increasing fluid viscosity decreases fluid motion, and correspondingly, decreases free annular convection. The fluid, when pumped into an annuli surrounding the production tubing or transfer piping, increases in viscosity while maintaining the fluid in contact with the annuli to form a crosslinked hydrated polymer system in the brine. The fluid thus enhances the thermal insulating quality around the tubing or piping, thereby reducing heat loss from it.

The well treatment fluid defined herein should be approached on a specific project basis to meet a target objective in terms of density. Density is normally dictated by the required hydrostatic pressure needed to control the well, and may be achieved by the amount and type of salt dissolved within the composition (resulting from the brine, etc.).

The well treatment fluid defined herein may further be used as a fracturing fluid wherein it is injected into the borehole or perforated cased hole and contacts at least a portion of the formation under sufficient pressure to fracture the formation. The fracturing fluid may be used to carry proppant into the formation. The proppant may be introduced into the formation with the fracturing fluid. The viscosity of the pumpable polymerizable fluid, when used as a fracturing fluid, must be sufficient to suspend and carry the proppant into the formation.

When used as a fracturing fluid, the well treatment fluid may further contain a conventional breaking agent which is capable of reducing the viscosity of the gelled fluid in order to convert the viscous gel into a lower viscosity fluid. This allows the fluid to be easily and effectively removed from the formation and to allow desired material, such as oil or gas, to flow into the well bore. Acceptable breakers include inorganic breakers like magnesium peroxide, calcium peroxide, zinc peroxide, sodium bromate, potassium bromate, or persulfate compounds.

Suitable proppants may include, but are not limited to, quartz sand grains, glass and ceramic beads, walnut shell fragments, aluminum pellets, nylon pellets, as well as relatively lightweight propping materials having an apparent specific gravity (ASG) less than or equal to 2.45. In a preferred embodiment, the proppant is an ultra lightweight proppant having an ASG less than or equal to 1.75.

When used as a fracturing fluid, the fluid may also contain other conventional additives, such as surfactants, corrosion inhibitors, mutual solvents, stabilizers, paraffin inhibitors, tracers to monitor fluid flow back, etc.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

About 3 ml of 2-hydroxyethyl methacrylate, commercially available as BM-903 from Degussa Co., 0.5 ml of polyethylene glycol dimethacrylate having a molecular weight of about 400, commercially available as MFM 409 from Degussa Co., and 0.25 g of 2,2'-azobis(2-amidinopropane)dihydrochloride, commercially available as Wako V-50 from Degussa Co., were added to 100 ml of calcium bromide brine having a density of 14.2 ppg, while stirring. When heated to 140° F., polymerization occurred. The system became immobilized by forming a "rub-like" crosslinked texture.

Example 2

About 3 ml of 2-hydroxyethyl methacrylate, 0.5 ml of MFM 409 and 0.25 g Wako V-50 were added to 75 ml of calcium bromide brine having a density of 14.2 ppg and 25 ml of propylene glycol while stirring. When the system was heated to a temperature between 140° and 170° F., polymerization occurred and the whole system became immobilized by forming a more flowable crosslinked texture.

Example 3

About 3 ml of 2-hydroxyethyl methacrylate, 0.5 ml of MFM 409 and 0.25 g Wako V-50 were added to 100 ml of calcium bromide brine having a density of 14.2 ppg while stirring. The rheology profile of this fluid at 220° F. was obtained by Fann 50 and is illustrated in FIG. 1. FIG. 1 demonstrates temperature induced crosslinking and attainment of a highly stable gel.

From the foregoing, it will be observed that numerous variations and modifications may be effected without departing from the true spirit and scope of the novel concepts of the invention.

What is claimed is:

1. A method for enhancing the thermal insulation of a production tubing or transfer pipe surrounded by at least one annuli in an oil, gas or geothermal well, comprising:
   (a) adding to the at least one annuli a pumpable polymerizable fluid comprising a crosslinkable, monofunctional alkene, a multi-functional alkene, a heat inducible free radical initiator and brine;
   (b) decomposing the heat inducible free radical initiator; and
   (c) increasing the viscosity of the pumpable polymerizable fluid while maintaining the fluid in contact with the at least one annuli to form a crosslinked hydrated polymer system in the brine.

2. The method of claim 1, wherein the brine has a density greater than or equal to 9 ppg.

3. The method of claim 2, wherein the brine is selected from the group consisting of sodium chloride, potassium chloride, calcium chloride, sodium bromide, calcium bromide, zinc bromide, potassium formate, cesium formate and sodium formate brine and mixtures thereof.

4. The method of claim 3, wherein the brine is at least one brine selected from the group consisting of calcium chloride, calcium bromide and zinc bromide.

5. The method of claim 2, wherein the brine has a density between 9 and 19.2.

6. The method of claim 1, wherein the monofunctional alkene is selected from the group consisting of acrylic acid and methacrylic acid and amides, esters, salts or nitriles thereof.

7. The method of claim 6, wherein the monofunctional alkene is selected from the group consisting of hydroxyethylacrylate, hydroxymethylacrylate, hydroxyethylmethacrylate, hydroxymethylmethacrylate, polyethylene glycol acrylate, polyethylene glycol methacrylate, polypropylene glycol acrylate, polypropylene glycol methacrylate, tetrahydrofuryl methacrylate, glycidyl methacrylate, N,N-dimethylaminoethylmethacrylate, 2-triethylammoniumethylmethacrylate chloride, N,N-dimethyl-aminopropylmethacryl-amide, methacrylamidepropyltriethylammonium chloride, N-hydroxymethylacrylamide and N-hydroxymethyl-methacrylamide and mixtures thereof.

8. The method of claim 1, wherein the multi-functional alkene is a difunctional alkene.

9. The method of claim 8, wherein the difunctional alkene is selected from the group consisting of diethylene glycol dimethacrylate, diethylene glycol diacrylate, polyethylene glycol dimethacrylate and polyethylene glycol diacrylate.

10. The method of claim 1, wherein the free radical initiator is selected from the group consisting of 2,2'-azobis(2-imidazole-2-hydroxyethyl)propane, 2,2'-azobis(2-aminopropane) dihydrochloride, 4,4'-azobis(4-cyanovaleric acid) and 2,2'-azobis(2-methyl-N-(2-hydroxyethyl)propionamide.

11. The method of claim 1, wherein the volume ratio of crosslinkable, monofunctional alkene to multi-functional alkene in the pumpable polymerizable fluid is between from about 2:1 to about 20:1.

12. The method of claim 1, wherein the amount of free radical initiator in the pumpable polymerizable fluid is between from about 0.01 to about 0.5 g/100 ml.

13. The method of claim 1, wherein the fluid further comprises a polyol.

14. The method of claim 13, wherein the polyol is selected from the group consisting of glycerol, ethylene glycol, propylene glycol, butylene glycol, polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers and mixtures thereof.

15. The method of claim 1, wherein the amount of monofunctional alkene in the fluid is between from about 1% to about 30% by weight of the fluid.

16. A method for reducing convection flow velocity in at least one annuli surrounding a production tubing or transfer pipe in an oil, gas or geothermal well, comprising:
(a) introducing into the at least one annuli an insulating packer or riser fluid comprising a fluid comprising a crosslinkable, mono functional alkene, a multi-functional alkene, a heat inducible free radical initiator and brine; and
(b) decomposing the free radical initiator;
(c) increasing the viscosity of the insulating packer or riser fluid by forming a crosslinked polymer in the brine; and
(d) maintaining the fluid in the at least one annuli until the convection flow velocity is reduced.

17. The method of claim 16, wherein the packer fluid is introduced above the packer in an annulus and the riser fluid is introduced into a riser annulus.

18. The method of claim 16, wherein the brine has a density greater than or equal to 9 ppg.

19. The method of claim 18, wherein the brine is selected from the group consisting of sodium chloride, potassium chloride, calcium chloride, sodium bromide, calcium bromide, zinc bromide, potassium formate, cesium formate and sodium formate brine and mixtures thereof.

20. The method of claim 16, wherein the monofunctional alkene is selected from the group consisting of hydroxyethylacrylate, hydroxymethylacrylate, hydroxyethylmethacrylate, hydroxymethylmethacrylate, polyethylene glycol acrylate, polyethylene glycol methacrylate, polypropylene glycol acrylate, polypropylene glycol methacrylate, tetrahydrofuryl methacrylate, glycidyl methacrylate, N,N-dimethylaminoethylmethacrylate, 2-triethylammoniumethylmethacrylate chloride, N,N-dimethyl-aminopropylmethacryl-amide, methacrylamidepropyltriethylammonium chloride, N-hydroxymethylacrylamide and N-hydroxymethyl-methacrylamide and mixtures thereof.

21. The method of claim 16, wherein multi-functional alkene of the fluid of step (a) is a difunctional alkene.

22. The method of claim 21, wherein the difunctional alkene is selected from the group consisting of diethylene glycol dimethacrylate, diethylene glycol diacrylate, polyethylene glycol dimethacrylate and polyethylene glycol diacrylate.

23. The method of claim 16, wherein the insulating packer or riser fluid of step (a) further comprises a polyol.

24. A method for enhancing the thermal insulation of a production tubing or transfer pipe surrounded by at least one annuli in an oil, gas or geothermal well, comprising:
(a) adding to the at least one annuli a pumpable polymerizable fluid comprising a crosslinkable, monofunctional alkene, a difunctional alkene, a heat inducible free radical initiator and brine having a density between 9 to 19.2 ppg;
(b) decomposing the heat inducible free radical initiator; and
(c) increasing the viscosity of the pumpable polymerizable fluid while maintaining the fluid in contact with the at least one annuli to form a crosslinked hydrated polymer system in the brine.

25. The method of claim 24, wherein the brine has a density from 14.2 to 19.2 ppg.

26. The method of claim 24, wherein the monofunctional alkene is selected from the group consisting of hydroxyethylacrylate, hydroxymethylacrylate, hydroxyethylmethacrylate, hydroxymethylmethacrylate, polyethylene glycol acrylate, polyethylene glycol methacrylate, polypropylene glycol acrylate, polypropylene glycol methacrylate, tetrahydrofuryl methacrylate, glycidyl methacrylate, N,N-dimethylaminoethylmethacrylate, 2-triethylammoniumethylmethacrylate chloride, N,N-dimethyl-aminopropylmethacryl-amide, methacrylamidepropyltriethylammonium chloride, N-hydroxymethylacrylamide and N-hydroxymethyl-methacrylamide and mixtures thereof.

27. The method of claim 26, wherein the difunctional alkene is selected from the group consisting of diethylene glycol dimethacrylate, diethylene glycol diacrylate, polyethylene glycol dimethacrylate and polyethylene glycol diacrylate.

28. The method of claim 24, wherein the brine is selected from the group consisting of sodium chloride, potassium chloride, calcium chloride, sodium bromide, calcium bromide, zinc bromide, potassium formate, cesium formate and sodium formate brine and mixtures thereof.

* * * * *